(12) United States Patent
Teneze et al.

(10) Patent No.: US 7,474,856 B2
(45) Date of Patent: Jan. 6, 2009

(54) METHOD AND DEVICE FOR PRODUCING AN OPTICAL LINK WITH LASER PULSES

(75) Inventors: Bernard Teneze, Trouy (FR); Frank Bernoux, L'Hay-les-Roses (FR)

(73) Assignee: MBDA France, Paris (FR)

( * ) Notice: Subject to any disclaimer, the term of this patent is extended or adjusted under 35 U.S.C. 154(b) by 558 days.

(21) Appl. No.: 10/516,538

(22) PCT Filed: Dec. 9, 2003

(86) PCT No.: PCT/FR03/03635

§ 371 (c)(1),
(2), (4) Date: Dec. 2, 2004

(87) PCT Pub. No.: WO2004/064274

PCT Pub. Date: Jul. 29, 2004

(65) Prior Publication Data

US 2005/0174559 A1      Aug. 11, 2005

(30) Foreign Application Priority Data

Dec. 10, 2002    (FR) .................................. 02 15583

(51) Int. Cl.
    *H04B 10/00*      (2006.01)
    *H04B 10/02*      (2006.01)
    *F41G 7/00*       (2006.01)
    *G01C 21/24*      (2006.01)

(52) U.S. Cl. ........................ 398/120; 398/118; 398/119; 398/130; 244/3.11; 244/3.16; 250/203.1; 250/203.3; 250/203.6

(58) Field of Classification Search ............. 250/203.1, 250/203.3; 398/118, 120; 244/3.15, 3.16, 244/3.17, 3.19
See application file for complete search history.

(56) References Cited

U.S. PATENT DOCUMENTS 3,371,232 A  *  2/1968  Hannan et al. ........... 372/38.03
3,829,047 A     8/1974  Gonsalves
(Continued)

FOREIGN PATENT DOCUMENTS

DE          3421141          12/1988
(Continued)

OTHER PUBLICATIONS

Internet Publication "Module 3-2, Pulsed Laser Flashlamps and Power Supplies", Jan. 16, 2001, p. 11, http://cord.org/cm/leot/course03_mod02/mod03/02.htm.*
(Continued)

*Primary Examiner*—Kenneth N Vanderpuye
*Assistant Examiner*—Daniel G Dobson
(74) *Attorney, Agent, or Firm*—Dickinson Wright, PLLC

(57) ABSTRACT

A method and device produce an optical link with laser pulses between an emitter of the pulses and a receiver of the pulses. The optical link is used by a locating device for locating a body moving at constant speed away from the locating device. The locating device delays the start of emission of the laser pulses with respect to the departure of the moving body and varies the energy of the successive laser pulses in proportion to the square of the time elapsed since the start of emission of the pulses.

4 Claims, 2 Drawing Sheets

U.S. PATENT DOCUMENTS

| | | | |
|---|---|---|---|
| 4,013,244 | A | 3/1977 | Blom et al. |
| 4,216,520 | A * | 8/1980 | Horblin ............... 361/239 |
| 4,710,028 | A | 12/1987 | Grenier et al. |
| 6,466,041 | B1 | 10/2002 | Egerer et al. |
| 6,880,467 | B1 * | 4/2005 | Knapp ................ 102/513 |
| 2002/0181055 | A1 * | 12/2002 | Christiansen et al. ....... 359/159 |

FOREIGN PATENT DOCUMENTS

| FR | 2274887 | 1/1976 |
|---|---|---|
| FR | 2583523 | 12/1986 |

OTHER PUBLICATIONS

Internet Publication "Intensity: the Inverse Square Law", Apr. 27, 1997, http://csep10.phys.utk.edu/astr162/lect/light/intensity.html.*

International Search Report dated May 6, 2004 with English translation.

* cited by examiner

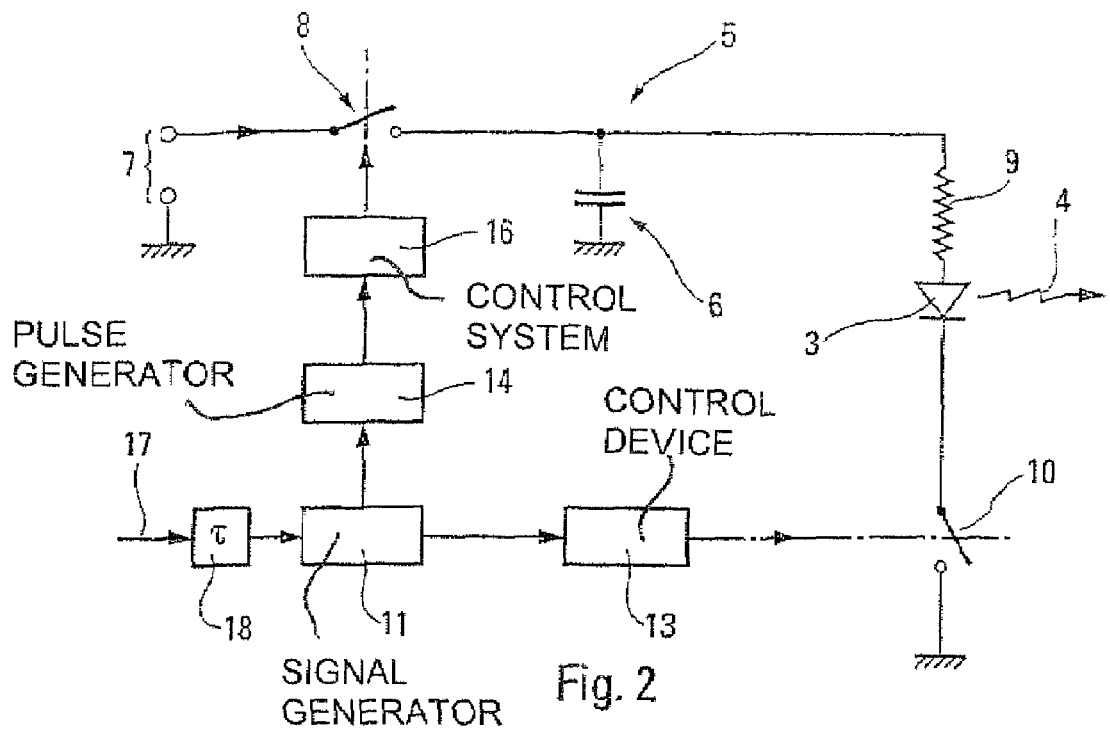
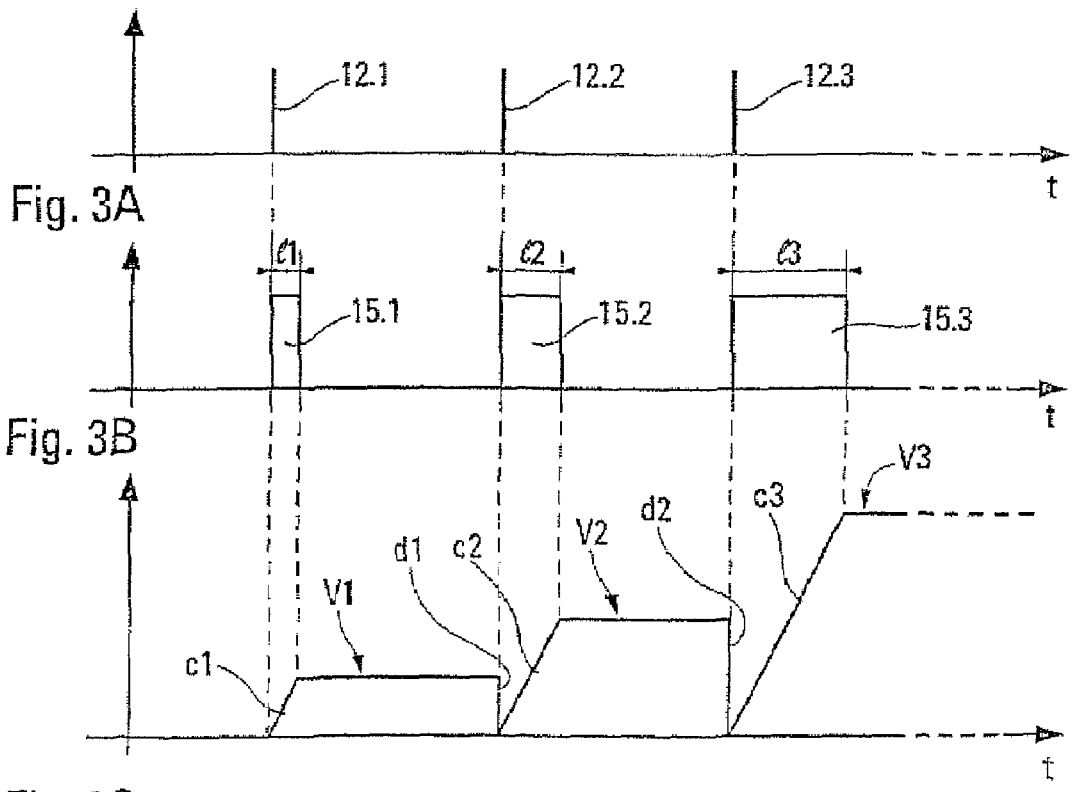

METHOD AND DEVICE FOR PRODUCING AN OPTICAL LINK WITH LASER PULSES

FIELD OF THE INVENTION

The present invention relates to a method and a device for producing an optical link by light pulses between the emitter of the said pulses and a receiver of the said pulses, especially appropriate for use in locating devices and missile guidance devices, such as described, for example, in the document U.S. Pat. No. 4,710,028 (FR-2 583 523).

BACKGROUND OF THE RELATED ART

In the known devices of this type, the emitter of the said light pulses, which can be mounted on board the said missile or placed in a fixed station, the optical link then comprising a mirror mounted on board the missile and returning the said light pulses to the said detector, is generally a flash lamp, which is bulky and which consumes a large amount of energy.

Because of this, the replacement of the said flash lamp by a laser source has already been considered. But then the emitted laser energy must be high in order to ensure a long range optical link withstanding possible jamming. This therefore results not only in high ocular risks for the operators of the said devices, but also in high power laser sources.

The purpose of the present invention is to overcome these disadvantages by making it possible to produce a laser optical link with low ocular risk and with low energy consumption.

SUMMARY OF THE INVENTION

For this purpose, according to the invention, the method for producing an optical link with laser pulses between the emitter of the said pulses and a receiver of the said pulses, the said optical link being used by a locating device for locating a moving object moving away from the said locating device, is noteworthy in that the start of emission of the said laser pulses is delayed with respect to the departure of the moving object and in that the energy of the said successive laser pulses is varied as an increasing function of the time elapsing from the start of the emission of the said laser pulses.

In this way all ocular risk is avoided before and during the departure of the moving object, since no laser energy is emitted before the said departure and the emission of the laser pulses is delayed with respect to the departure of the moving object until the time when it is really necessary for the location of the moving object. The emitter then emits a low energy which increases progressively with the distance between the emitter and the receiver, the energy necessary at the maximum range of the moving object being emitted only at the end of the range, that is to say in a zone where there is no operator.

It will be noted that the document U.S. Pat. No. 4,013,244 describes a control device for an optical beam guiding a missile towards a target, a device in which, for technical reasons different from the ocular risks described above, the energy of the said guidance beam is increased during the flight of the said missile by servo-control according to a desired law.

In the present invention, the increase in power is, on the contrary, predetermined as a function of time such that no servo-control is necessary. Furthermore, due to the invention, this increase in power can be relatively slow, making the link practically immune from electromagnetic interference.

The laser source can be a laser diode. However, in order to reduce the energy emitted by the emitter and therefore to complete the protection with respect to ocular risk, it is advantageous for the latter to consist of a VCSEL (Vertical Cavity Surface Emitting Laser) laser. In fact, such a semiconductor laser, with a gallium arsenide substrate, emits a slightly divergent beam (+or −7°), which makes it possible to confine the emitted energy in a cone that is just necessary for the location of the moving object. The volume illuminated by the emitter, within which an ocular risk would be possible, is therefore very small. Furthermore, the conversion efficiency of a VCSEL laser between the energy received and the energy supplied is particularly good, such that the electrical energy consumed can be low.

Furthermore, in order for the amplitude of the laser pulses received by the receiver to be constant, it is necessary for the energy emitted by the emitter to vary in proportion to the square of the emitter-receiver distance.

Also, in the case where the moving body is moving at constant speed, the energy of the said successive laser pulses is varied in proportion to the square of the time elapsed since the start of emission of the said pulses.

For this purpose, it is possible to use a capacitor whose successive discharges supply the said emitter in order to produce the said successive laser pulses and whose successive charges are controlled by successive charging rectangular pulses whose durations are a linearly increasing function of time.

Thus, the energy delivered by a capacitor to the laser diode or to the VCSEL laser is equal to $\frac{1}{2} C V^2$ (C being the capacitance of the capacitor in Farads and V being the discharge voltage in volts of the said capacitor), that is to say directly proportional to the square of the elapsed time.

Because of the present invention, the following is therefore obtained:

a reduction of the energy emitted and consumed. In fact, due to the laser diode, the emission of energy directly to the receiver and its confinement within the required cone, makes it possible to economize this energy, in comparison with the energy emitted over $4\pi$ steradians by a flash lamp and more or less redirected towards the receiver by a mirror and a complex lens. A narrow emitted spectral bans (a few nm) can be entirely included within a high sensitivity spectral band of the receiver, unlike the wide spectral band emitted by a flash lamp (>1000 nm) in which a large part of the energy is lost at the level of the receiver. For an identical received signal level, the energy emitted by a coherent source can therefore be much lower than the energy emitted by a wide spectrum lamp. A laser diode or a VCSEL laser moreover has a better emitted energy/consumed energy ratio and requires neither a high voltage nor a very high striking voltage. The reduction of the consumed electrical energy is therefore very great;

a reduction of weight and of bulk. A laser diode or a VCSEL laser being much less voluminous than a flash lamp, necessitating a simpler electrical power supply circuit (no high voltage and very high voltage converter) and consuming less energy, it is possible to produce a less voluminous and lighter emitter than with a flash lamp;

reduction of dazzling of the receiver. As the energy emitted is low at the departure, the sensor used by the receiver is not dazzled and the signal level of the receiver is more regular as the moving object moves further away;

the reduction of electromagnetic emissivity. As the voltage used and the energy involved with a laser diode or a VCSEL laser are much lower than those of a flash lamp, the electromagnetic emissivity of a laser is much lower than that of a flash emitter;

an improvement in spectral selectivity. A source having a very narrow emission wavelength makes it possible to reduce the spectral band of the receiver and thus to improve the signal to background ratio.

BRIEF DESCRIPTION OF THE DRAWINGS

The figures of the appended drawing will give a good understanding of how the invention may be embodied. In these figures, identical references indicate similar elements.

FIG. 2 is the block diagram of a laser pulse emitter mounted on board the said missile.

FIGS. 3A, 3B and 3C are timing diagrams illustrating the functioning of the emitter shown in FIG. 2.

DETAILED DESCRIPTION OF THE INVENTION

Figure 1:
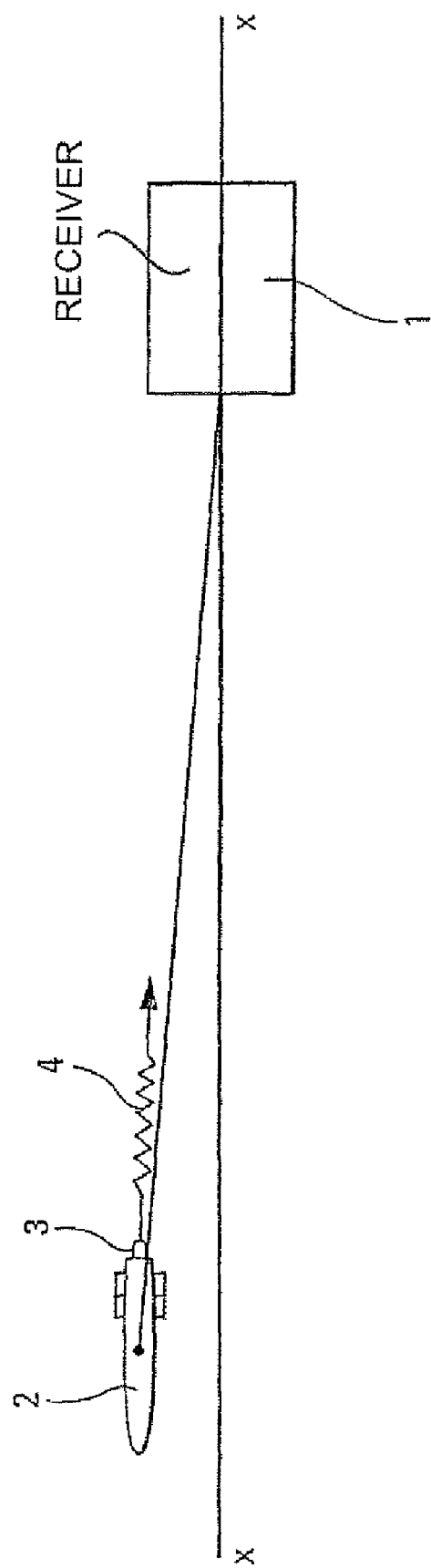
FIG. 1 is a diagrammatic illustration of the location of a missile.

In FIG. 1, there has been shown a device 1 capable of locating a missile 2 with respect to a reference axis X-X (for example a sighting axis), the said missile 2 becoming more distant at constant speed from the locating device 1. The latter is for example of the type described in the document U.S. Pat. No. 4,710,028 (FR-2 583 523).

For the purpose of it being located by the device 1, the missile 2 comprises a laser source 3, of the laser diode or VCSEL laser type, capable of emitting laser pulses 4 towards the said device 1.

The device 5, mounted on board the missile 1 and intended for controlling the laser source 3 comprises a capacitor 6 connected in parallel with the said laser source 3 and capable of being charged from a voltage source 7, by the intermediary of a controlled switch 8. Similarly, the circuit of the laser source 3, which comprises a load resistor 9, is closed by the intermediary of a controlled switch 10.

The device 5 furthermore comprises a generator 11 of periodic signals 12 (see FIG. 3A) capable of controlling the closing of the controlled switch 10 by the intermediary of a control device 13. Furthermore, the signal generator 11 controls a generator 14 of pulses 15 of variable width (see FIG. 3B), which itself controls the controllable switch 8 by the intermediary of a control system 16. The generator 14 is such that it emits a pulse in response to the reception of a signal 12 and such that the width of the pulses 15 increases linearly as a function of time t.

Before the departure of the missile 2, no laser pulses 4 are emitted by the laser source 3. There is therefore no ocular risk, even in the immediate environment of the missile 2.

At the time of the departure of the missile 2, a control command is sent to the signal generator 11 through a control line 17 on which is interposed a timing device 18. It is thus possible to delay the emission of the laser source 3 until the time when the laser pulses 4 are really necessary for the locating of the missile 2 by the device 1.

When the timing delay produced by the device 18 has elapsed, the generator 11 generates a first signal 12.1 which:

closes, for a short time, the switch 10 by the intermediary of the control device 13, such that a possible charge in the capacitor 6 can discharge through the laser source 3, by the intermediary of the load resistor 9, after which the said switch 10 immediately opens again; and controls the generator 14 which generates a first rectangular pulse 15.1, of temporal length 11, making it possible to close the switch 8 for the period 11, such that the capacitor 6 charges from the source 7 during the said period (see c1 of FIG. 3C). When the period 11 has elapsed, the capacitor 6 is charged up to the voltage level V1, which it maintains until the appearance of the next signal 12.2.

When the generator 11 emits the next signal 12.2, as before, the switch 10 closes instantaneously for a short time, such that the charge at the voltage V1 of the capacitor 6 discharges through the source 3 (see segment d1 in FIG. 3C) which emits a laser pulse 4, whilst the generator 14 generates a second rectangular pulse 15.2 of width 12 equal to 12=11+ $\delta t$ ($\delta t$ is a time period constant, the width of the rectangular pulse varies linearly with time). The result of this is that the width 12 has increased linearly with time t, with respect to the width 11. Consequently, the switch 10 being open again, the capacitor 6 charges over a time period 12 (see segment c2 in FIG. 3C) up to the voltage V2=kV1. This voltage V2 is maintained until the appearance of the third signal 12.3.

The same phenomenon as described in the previous paragraph then occurs, the charge at the voltage V2 of the capacitor 6 discharges through the source 3 (segment d2) emitting a laser pulse 4, after which this capacitor is charged to the voltage V3=kV2 during the third rectangular pulse 15.3, whose temporal width 13 is equal to 12+$\delta t$ . . .

Thus, the successive light pulses 4 result from discharges (d1, d2, . . . ) at voltages V1, V2, V3, . . . linearly increasing with time t, such that their energy increases in proportion to the square of time.

The invention claimed is:

1. A method for producing an optical link with laser pulses between an emitter of the pulses and a receiver of the pulses, the optical link being used by a locating device for locating a body moving at constant speed away from the locating device, the method comprising:

delaying the start of emission of the laser pulses with respect to the departure of the moving body; and producing said laser pulses by:

alternatively and successively charging and discharging a capacitor, controlling the successive charges of said capacitor by successive rectangular charging pulses whose durations are a linearly increasing function of time, and supplying said emitter with the successive discharges of said capacitor.

2. A device for producing an optical link with laser pulses between an emitter of the pulses and a receiver of the pulses, the optical link being used by a locating device for locating a body moving at constant speed away from the locating device, said device comprising:

a delay section that delays the start of emission of the laser pulses with respect to the departure of the moving body; and a controller that produces said laser pulses by:

alternatively and successively charging and discharging a capacitor, controlling the successive charges of said capacitor by successive rectangular charging pulses whose durations are a linearly increasing function of time, and supplying said emitter with the successive discharges of said capacitor.

3. The device as claimed in claim 2, wherein the emitter comprises at least one laser diode.

4. The device as claimed in claim 2, wherein the emitter comprises at least one vertical cavity surface emitting laser.

\* \* \* \* \*